(12) United States Patent
Park et al.

(10) Patent No.: US 12,066,704 B2
(45) Date of Patent: Aug. 20, 2024

(54) DISPLAY DEVICE COMPRISING A FRONT CHASSIS CONFIGURED TO BE MOVABLE FORWARD AND BACKWARD WITH RESPECT TO A MIDDLE MOLD

(71) Applicant: SAMSUNG ELECTRONICS CO., LTD., Suwon-si (KR)

(72) Inventors: Yeonkyun Park, Suwon-si (KR);
Sungpil Choi, Suwon-si (KR);
Yonghwan Park, Suwon-si (KR);
Chulho Son, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/244,637

(22) Filed: Sep. 11, 2023

(65) Prior Publication Data
US 2023/0418095 A1 Dec. 28, 2023

Related U.S. Application Data

(63) Continuation of application No. PCT/KR2022/004365, filed on Mar. 29, 2022.

(30) Foreign Application Priority Data

May 4, 2021 (KR) .................. 10-2021-0057814

(51) Int. Cl.
*G02F 1/1333* (2006.01)
*G02F 1/1343* (2006.01)

(52) U.S. Cl.
CPC .... *G02F 1/13332* (2021.01); *G02F 1/133314* (2021.01); *G02F 1/133317* (2021.01); *G02F 1/134363* (2013.01); *G02F 2202/28* (2013.01)

(58) Field of Classification Search
None
See application file for complete search history.

(56) References Cited

U.S. PATENT DOCUMENTS

| | | | |
|---|---|---|---|
| 5,710,607 A | 1/1998 | Iwamoto et al. | |
| 7,372,519 B2 | 5/2008 | Kim et al. | |

(Continued)

FOREIGN PATENT DOCUMENTS

| | | |
|---|---|---|
| CN | 104793364 B | 5/2018 |
| CN | 210514862 U | 5/2020 |

(Continued)

OTHER PUBLICATIONS

International Search Report (PCT/ISA/210) issued Jul. 22, 2022 by the International Searching Authority in counterpart International Application No. PCT/KR2022/004365.

(Continued)

*Primary Examiner* — Paul C Lee
(74) *Attorney, Agent, or Firm* — Sughrue Mion, PLLC

(57) ABSTRACT

The present disclosure relates to a display apparatus capable of reducing light leakage due to warpage of a liquid crystal panel. The display apparatus includes a rear chassis, a light source module installed on the rear chassis to output light, a liquid crystal panel disposed in front of the light source module that either blocks the light output from the light source module, or allows the light output from the light source module to pass, a middle mold coupled to be fixed to the rear chassis, and a front chassis provided to support the liquid crystal panel, the front chassis being coupled to the middle mold, wherein the front chassis is configured to be movable forward and backward with respect to the middle mold within a predetermined range.

15 Claims, 8 Drawing Sheets

(56) References Cited

U.S. PATENT DOCUMENTS

| | | | |
|---|---|---|---|
| 10,201,101 | B2 | 2/2019 | Lee et al. |
| 11,335,219 | B2 | 5/2022 | Kim |
| 11,435,611 | B2 | 9/2022 | Chae et al. |
| 2012/0050640 | A1 | 3/2012 | Yasui et al. |
| 2015/0237746 | A1* | 8/2015 | Lee ...................... H05K 5/0017 |
| | | | 361/679.01 |
| 2023/0292442 | A1* | 9/2023 | Li .......................... H05K 1/189 |

FOREIGN PATENT DOCUMENTS

| | | |
|---|---|---|
| JP | 2012-47913 A | 3/2012 |
| JP | 2013-164466 A | 8/2013 |
| JP | 2020-129068 A | 8/2020 |
| KR | 10-1996-0002204 B1 | 2/1996 |
| KR | 10-2005-0068198 A | 7/2005 |
| KR | 10-2006-0048084 A | 5/2006 |
| KR | 10-2013-0028220 A | 3/2013 |
| KR | 10-1277219 B1 | 6/2013 |
| KR | 10-1926430 B1 | 12/2018 |
| KR | 10-2019-0107213 A | 9/2019 |
| KR | 10-2020458 B1 | 9/2019 |
| KR | 10-2020-0075549 A | 6/2020 |
| KR | 10-2020-0084734 A | 7/2020 |

OTHER PUBLICATIONS

Written Opinion (PCT/ISA/237) issued Jul. 22, 2022 by the International Searching Authority in counterpart International Application No. PCT/KR2022/004365.

\* cited by examiner

DISPLAY DEVICE COMPRISING A FRONT CHASSIS CONFIGURED TO BE MOVABLE FORWARD AND BACKWARD WITH RESPECT TO A MIDDLE MOLD

CROSS-REFERENCE TO RELATED APPLICATIONS

This application is a Bypass Continuation Applications of PCT International Application No. PCT/KR2022/004365, filed on Mar. 29, 2022, which is based on and claims priority to Korean Patent Application No. 10-2021-0057814, filed on May 4, 2021, in the Korean Intellectual Property Office, the disclosure of which are incorporated by reference herein in their entireties.

BACKGROUND

1. Field

The present disclosure relates to a display apparatus capable of reducing light leakage due to warpage of a liquid crystal panel.

In general, a display apparatus, which is a type of output device that converts obtained or stored electrical information into visual information and displays the converted visual information to a user, is used in various fields such as homes and workplaces.

2. Description of Related Art

A display apparatus may include a self-emitting display panel or a light-receiving/emitting display panel.

A display apparatus to which the light-receiving/emitting display panel is applied may include a liquid crystal panel and a backlight unit supplying light to the liquid crystal panel.

The liquid crystal panel may include various types of panels such as a twist nematic (TN) panels, a vertical alignment (VA) panels, and an in-plane switching (IPS) mode panels.

The IPS mode panel has more light leakage from the panel than other types of panels due to warpage of the liquid crystal panel because of the nature of the arrangement structure of the liquid crystal.

SUMMARY

Provided is a display apparatus capable of reducing light leakage due to warpage of a liquid crystal panel.

The present disclosure is directed to providing a display apparatus capable of reducing an amount of warpage of a liquid crystal panel by providing the liquid crystal panel to be movable forward and rearward within a predetermined range.

The present disclosure is directed to providing a display apparatus capable of reducing stress due to warpage of a liquid crystal panel by providing forward and rearward movement degrees of freedom to a structure supporting the liquid crystal panel.

An aspect of the present disclosure provides a display apparatus including a rear chassis, a light source module installed on the rear chassis to output light, a liquid crystal panel disposed in front of the light source module to block or pass the light output from the light source module, a middle mold coupled to be fixed to the rear chassis, and a front chassis provided to support the liquid crystal panel, the front chassis being coupled to the middle mold to be movable forward and rearward with respect to the middle mold within a predetermined range.

The display apparatus may further include an adhesive member having one surface adhered to the liquid crystal panel and the other surface adhered to the front chassis, wherein the adhesive member attaches the liquid crystal panel to the front chassis.

When the liquid crystal panel is subjected to a force rearward, the adhesive member may be compressed rearward and the front chassis may move rearward.

The middle mold may include a guide part provided to guide at least a portion of the front chassis to move respectively to the middle mold.

The front chassis may include a slide part provided to slide forward and rearward with respect to the guide part.

The front chassis may further include a stopper part provided to limit a range of a forward movement of the slide part with respect to the guide part.

The middle mold may further include a support part provided to limit a range of a rearward movement of the front chassis with respect to the guide part and to support the middle mold.

The display apparatus may further include a buffer member disposed between the support part and the stopper part to reduce an impact caused by contact between the support part and the stopper part when the front chassis moves forward.

The front chassis may further include a base part provided to face the support part and to which an adhesive member is provided. The adhesive member attaches the liquid crystal panel to the front chassis, is attached.

The buffer member may be a first buffer member.

The display apparatus may further include a second buffer member disposed between the base part and the support part and provided to reduce an impact caused by contact between the base part and the support part when the front chassis moves rearward.

The first buffer member and the second buffer member may each include a foam tape.

The first buffer member may be attached to at least one of the support part and the stopper part.

The second buffer member may be attached to at least one of the support part and the base part.

An amount of a forward movement of the front chassis may be adjustable by adjusting an area of a front surface or a rear surface of the buffer member, a length of the buffer member in a front-rear direction, and a shrinkage rate of the buffer member.

The liquid crystal panel may include an in-plane switching (IPS) mode liquid crystal panel.

Another aspect of the present disclosure provides a display apparatus including a light source module provided to supply light, a housing provided to accommodate the light source module, a support coupled to the housing to be relatively movable in a first direction with respect to the housing and in a second direction opposite to the first direction, and a liquid crystal panel coupled to the support and configured to pass or block the light supplied from the light source module, wherein the support is provided to be movable in the first direction and the second direction when the liquid crystal panel is subjected to a force in the first direction and the second direction to reduce an amount of warpage of the liquid crystal panel.

The display apparatus may further include an adhesive member disposed between the liquid crystal panel and the support. The adhesive member attaches the liquid crystal panel to the support.

As the adhesive member is compressed in the first direction when the liquid crystal panel is subjected to a force in the first direction, the support may move in the first direction.

The display apparatus may further include a buffer member disposed between the support and the housing to reduce an impact caused by contact between the support and the housing when the support moves in the second direction with respect to the housing.

The buffer member may be a first buffer member.

The display apparatus may further include a second buffer member disposed between the support and the housing to prevent contact between the support and the housing when the support moves in the first direction with respect to the housing.

The liquid crystal panel may include an in-plane switching (IPS) mode liquid crystal panel.

According to the present disclosure, provided is a display apparatus capable of reducing light leakage due to warpage of a liquid crystal panel.

According to the present disclosure, provided is a display apparatus capable of reducing an amount of warpage of a liquid crystal panel by providing the liquid crystal panel that is movable forward and backward within a predetermined range.

According to the present disclosure, a display apparatus capable of reducing stress due to warpage of a liquid crystal panel can be provided by providing forward and backward movement degrees of freedom to a structure supporting the liquid crystal panel.

BRIEF DESCRIPTION OF DRAWINGS

The above and other aspects and features of certain embodiments of the present disclosure will be more apparent from the following description taken in conjunction with the accompanying drawings, in which.

DETAILED DESCRIPTION

Figure 1:
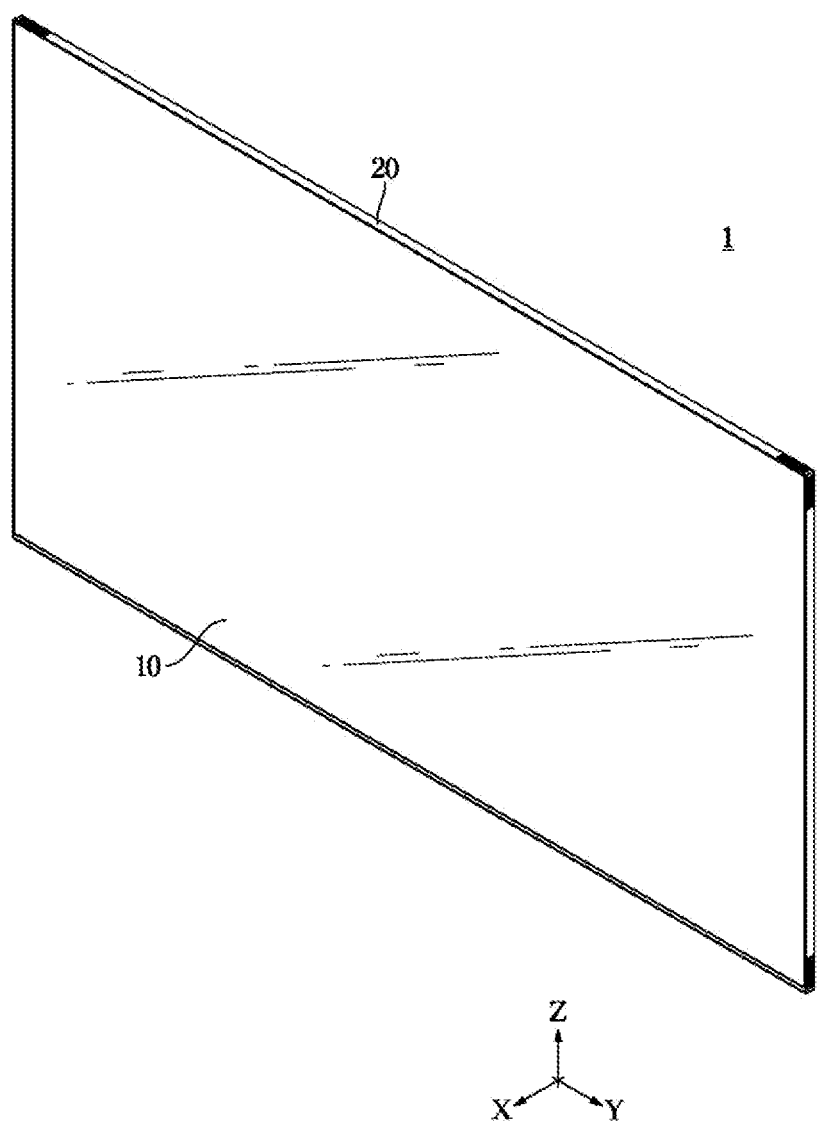
FIG. 1 is a perspective view of a display apparatus according to an embodiment of the present disclosure.

Because the embodiments described in this specification are only the most preferred embodiments of the present disclosure and do not represent all of the technical ideas of the present disclosure, it should be understood that various equivalents or modifications that may be substituted for them at the time of this application are also included in the scope of the present disclosure.

Singular expressions used in the specification may include plural expressions unless the context clearly dictates otherwise. The shapes and sizes of elements in the drawings may be exaggerated for clarity.

Terms such as "include" and "have" used in the specification are intended to indicate that there are features, numbers, steps, operations, components, parts, or combinations thereof described in the specification, and do not exclude the presence or addition of one or more other features, numbers, steps, operations, components, parts, or combinations thereof.

Terms such as "first" and "second" are used to distinguish one component from another, and the components are not limited by the aforementioned terms.

Expressions in the singular number include plural expressions unless the context clearly dictates otherwise.

Hereinafter, embodiments of the present disclosure will be described in detail with reference to the accompanying drawings.

In this specification, a housing may collectively refer to a middle mold 30 and a rear chassis 40. Also, a support may refer to a front chassis 20.

Hereinafter, an X direction refers to a front-rear direction of a display apparatus 1, a Y direction refers to a left-right direction of the display apparatus 1, and a Z direction refers to a vertical direction of the display apparatus 1.

Figure 2:
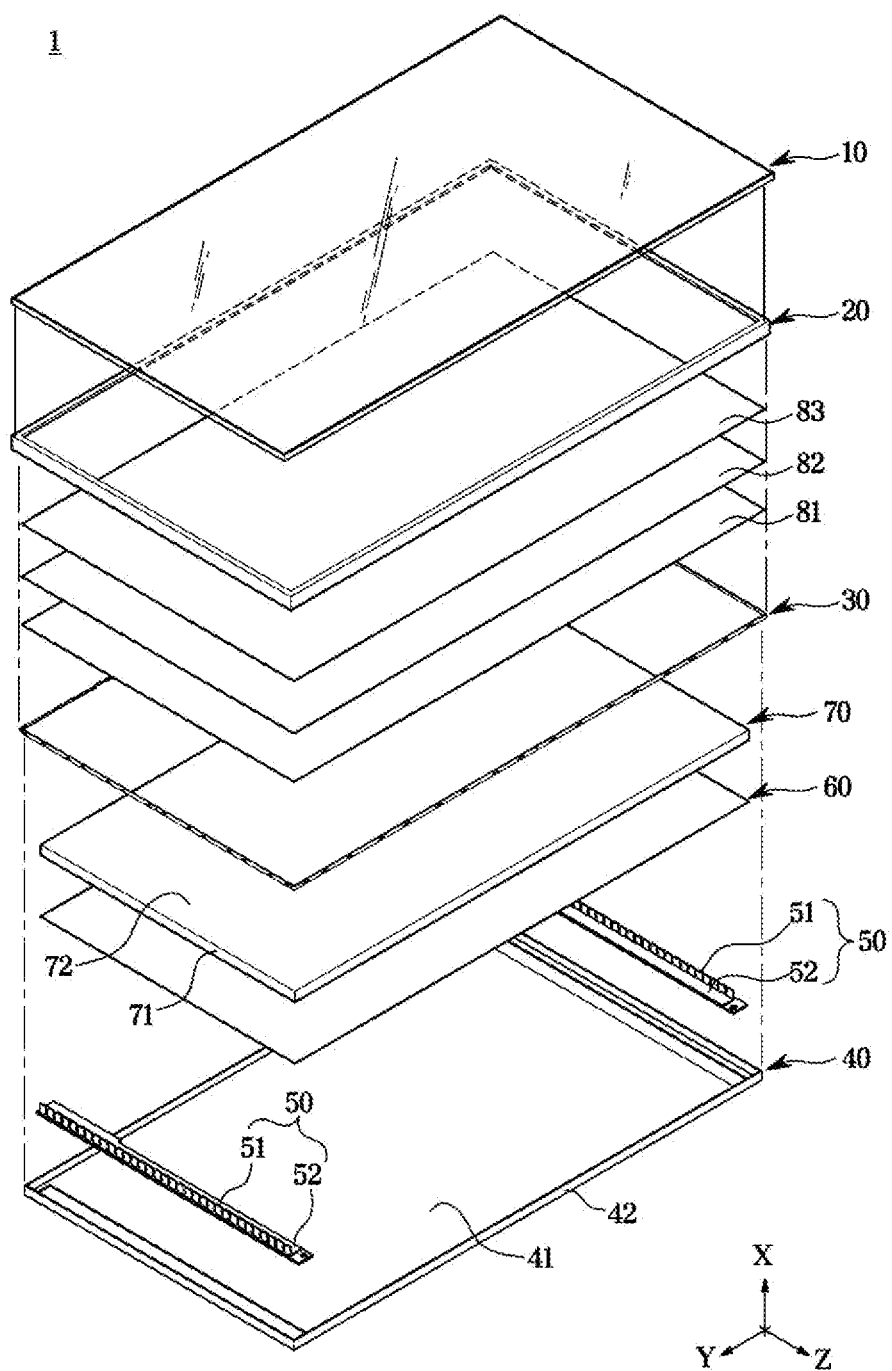
FIG. 2 is an exploded perspective view of the display apparatus according to an embodiment of the present disclosure.

FIG. 1 is a perspective view of a display apparatus according to an embodiment of the present disclosure. FIG. 2 is an exploded perspective view of the display apparatus according to an embodiment of the present disclosure.

As illustrated in FIGS. 1 and 2, the display apparatus 1 may include a liquid crystal panel 10 provided to display an image as a display unit of the display apparatus 1, and a light source module 50 provided to supply light to the liquid crystal panel 10.

The liquid crystal panel 10 may display an image using liquid crystal that exhibits optical properties depending on changes in voltage and temperature. The liquid crystal panel 10 may be disposed in front of the light source module 50 to block or transmit light output from the light source module 50.

The liquid crystal panel 10 may include various types of panels. For example, the liquid crystal panel may include various types of panels such as a twist nematic (TN) panel, a vertical alignment (VA) panel, or an in-plane switching (IPS) mode panel.

According to an embodiment of the present disclosure, the liquid crystal panel 10 may be an IPS mode panel. The IPS mode panel shows more light leakage than other panels due to warping of the liquid crystal panel because of the nature of the arrangement structure of the liquid crystal. Therefore, it is required to reduce an amount of warpage of the liquid crystal panel 10 in order to reduce such a light leakage phenomenon of the liquid crystal panel 10. In particular, because the liquid crystal panel 10 is provided very thinly in a front-rear direction and thus warpage occurs a lot in the front-rear direction, it is important to reduce such a lot of warping.

The light source module 50 may be disposed at the rear of the liquid crystal panel 10 to supply light to the liquid crystal panel 10. The light source module 50 may be an edge type in which the light source 11 is disposed on at least one side of a plurality of long sides and a plurality of short sides of the liquid crystal panel 10. Alternatively, the light source module may be a direct type in which a light source is disposed at the rear of the liquid crystal panel to directly radiate light to the liquid crystal panel.

The light source module 50 may include a light source 51 and a printed circuit board 52 on which the light source 51 is mounted. According to an embodiment of the present disclosure, the light source module 50 may be an edge type.

The light source 51 may be provided to supply light to the liquid crystal panel 10. The light source 51 may include a light emitting diode (LED). Alternatively, a cold cathode fluorescent lamp (CCFL) or an external electrode fluorescent lamp (EEFL) may be used as a light source.

On the printed circuit board 52, a plurality of the light sources 51 may be mounted in a line along an edge of the liquid crystal panel 10. A circuit pattern and the like for transmitting driving power and signals to the light source 51 may be formed on the printed circuit board 52. The printed circuit board 52 may be installed on the rear chassis 40.

An optical member may be disposed on a movement path of light emitted from the light source 51 to guide a traveling direction of light or improve optical characteristics.

The optical member may include a reflector sheet 60 provided to reflect light to prevent light loss, a light guide plate 70 provided to evenly disperse light emitted from the light source 51 toward the liquid crystal panel 10, and various optical sheets 81, 82, and 83 provided to improve light characteristics.

The reflector sheet 60 reflects light emitted from the light source 51 so that the reflected light may be incident on a rear surface of the light guide plate 70. The reflector sheet 60 may be formed in various forms such as a sheet, a film, and a plate. For example, the reflector sheet 60 may be formed by coating a base material with a material having high reflectivity. Stainless steel, brass, aluminum, PET, etc. may be used as the base material, and silver, $TiO_2$, etc. may be used as a high reflection coating agent.

The reflector sheet 60 may be disposed and supported on the printed circuit board 52.

The light guide plate 70 may be formed of a poly methyl methacrylate acrylate (PMMA) material. A pattern for changing a path of light may be provided on the light guide plate 70. The light guide plate 70 may include an incident surface 71 into which light emitted from the light source 51 is incident. In addition, the light guide plate 70 may further include an emission surface 72 through which light incident on the light guide plate 70 is emitted toward the liquid crystal panel 10. In the light source module 50 according to an embodiment of the present disclosure, the light source 51 may be positioned to face a side surface of the light guide plate 70. That is, the incident surface 71 of the light guide plate 70 may be formed on the side surface of the light guide plate 70 facing the light source 51. Light incident on the incident surface 71 of the light guide plate 70 may be scattered in a pattern formed on the rear surface of the light guide plate 70 and emitted through the emission surface 72 of the light guide plate 70.

The light guide plate 70 may be disposed on the reflector sheet 60. The light guide plate 70 may be disposed such that the incident surface 71 of the light guide plate 70 is spaced from the light source 51 by a predetermined distance in consideration of thermal expansion.

The optical sheets 81, 82, and 83 may be disposed in front of the light guide plate 70 to improve characteristics of light emitted from the light guide plate 70.

The optical sheets 81, 82, and 83 may include the quantum dot sheet 81, the diffuser sheet 82, and the prism sheet 83.

The quantum dot sheet 81 may improve color reproducibility by changing wavelengths of light. The color reproducibility is a measure of how close a color is to a natural color, and how large an area can be expressed on color coordinates. The quantum dot sheet 81 may be provided to convert a wavelength of light emitted from the light source 51.

Inside the quantum dot sheet 81, quantum dots, which are semiconductor crystals having a size of several nanometers that emit light, may be disposed to be dispersed. The quantum dots may receive blue light and generate all colors of visible light depending on sizes thereof. The smaller the size of the quantum dot is, the shorter wavelength light may be generated, and the larger the size of the quantum dot, the longer wavelength light may be generated.

The diffuser sheet 82 may cancel or minimize the pattern of the light guide plate 70. Because the light guided through the light guide plate 70 directly enters an eye and thus the pattern of the light guide plate 70 is reflected in the eyes as it is, the diffuser sheet 82 cancels or minimizes the light.

The prism sheet 83 may improve light brightness by re-concentrating the light whose brightness rapidly decreases while passing through the diffuser sheet 82. As the prism sheet 83, a dual brightness enhancement film (DBEF) sheet, which is a high-brightness prism sheet, or the like may be used.

However, unlike an embodiment of the present disclosure, the optical sheet may further include a protection sheet for protecting the optical sheet from external impact or inflow of foreign substances. In addition, a composite sheet in which performance of at least two of the quantum dot sheet 81, the diffuser sheet 82, and the prism sheet 83 are combined may be used.

The optical sheets 81, 82, and 83 may be disposed between the light guide plate 70 and the liquid crystal panel 10. Specifically, the optical sheets 81, 82, and 83 may be disposed between the light guide plate 70 and the liquid crystal panel 10 and supported by the middle mold 30.

The display apparatus 1 may include the front chassis 20, the middle mold 30 and the rear chassis 40, which accommodate and support the liquid crystal panel 10 and the light source module 50.

The front chassis 20 may be provided to support the liquid crystal panel 10. The liquid crystal panel 10 may be attached to and supported by the front chassis 20. A description thereof will be given later.

The light source module 50 may be installed in the rear chassis 40. The rear chassis 40 may include a bottom part 41 disposed at the rear of the light source module 50 and a bottom side part 42 extending forward from the bottom part 41. The printed circuit board 52 of the light source module 50 may be disposed on the bottom part 41.

The rear chassis 40 may radiate heat generated from the light source 51 to the outside. The heat generated from the light source 51 may be transferred to the rear chassis 40 via the printed circuit board 52 and may be radiated from the rear chassis 40. To this end, the rear chassis 40 may be formed of various metal materials such as aluminum and stainless steel having excellent thermal conductivity, or a plastic material such as ABS. A metal PCB made of aluminum having excellent thermal conductivity may also be used as the printed circuit board 52.

The middle mold 30 may be coupled to be fixed to the rear chassis 40. The middle mold 30 may be fixed so as to not move respectively to the rear chassis 40. The middle mold 30 may include a middle mold body 31, a pair of middle mold legs 32 extending backward from the middle mold body 31, a support part 33 provided to support the front chassis 20, and a guide part 34 provided to insert at least a portion of the front chassis 20 therein.

The middle mold body 31 may extend in a left-right direction (Y direction) of the display apparatus 1. The middle mold leg 32 may extend from one side of the middle mold body 31 in the front-rear direction (X direction). The middle mold legs 32 may include a pair of the middle mold legs 32 disposed to be spaced apart from each other by a predetermined distance in the left-right direction. The bottom side part 42 may be fitted between the pair of middle mold legs 32.

The front chassis 20 may be coupled to the middle mold 30 so as to be relatively movable within a predetermined range in the front-rear direction. A description thereof will be given later.

Figure 3:
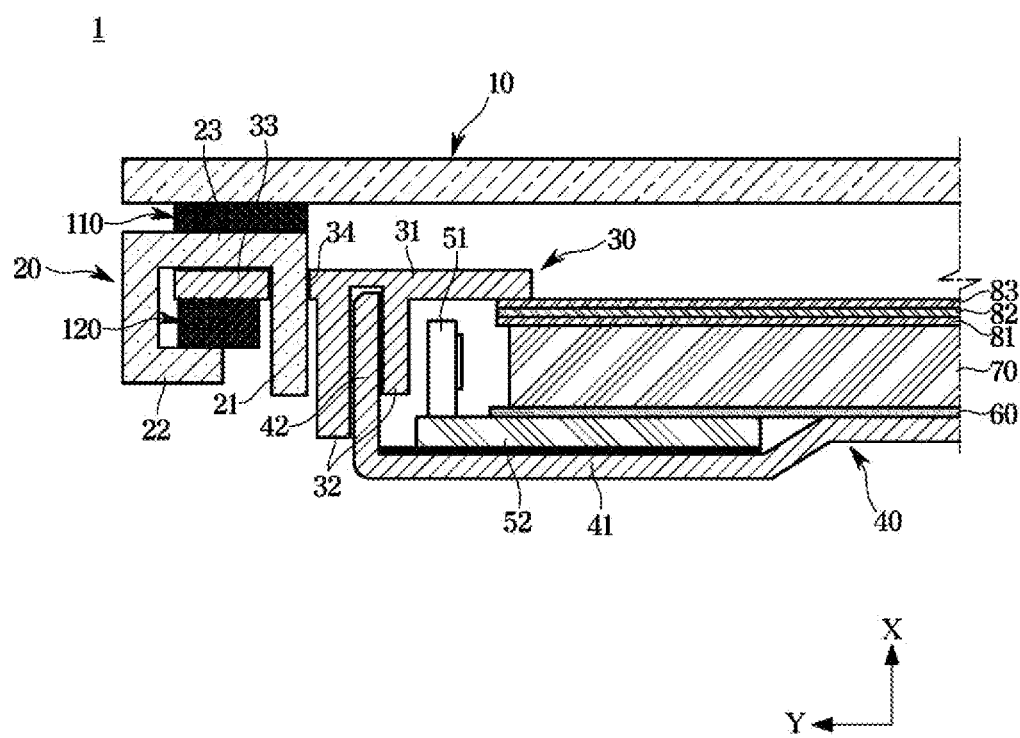
FIG. 3 is a side cross-sectional view of the display apparatus according to an embodiment of the present disclosure.
Figure 4:
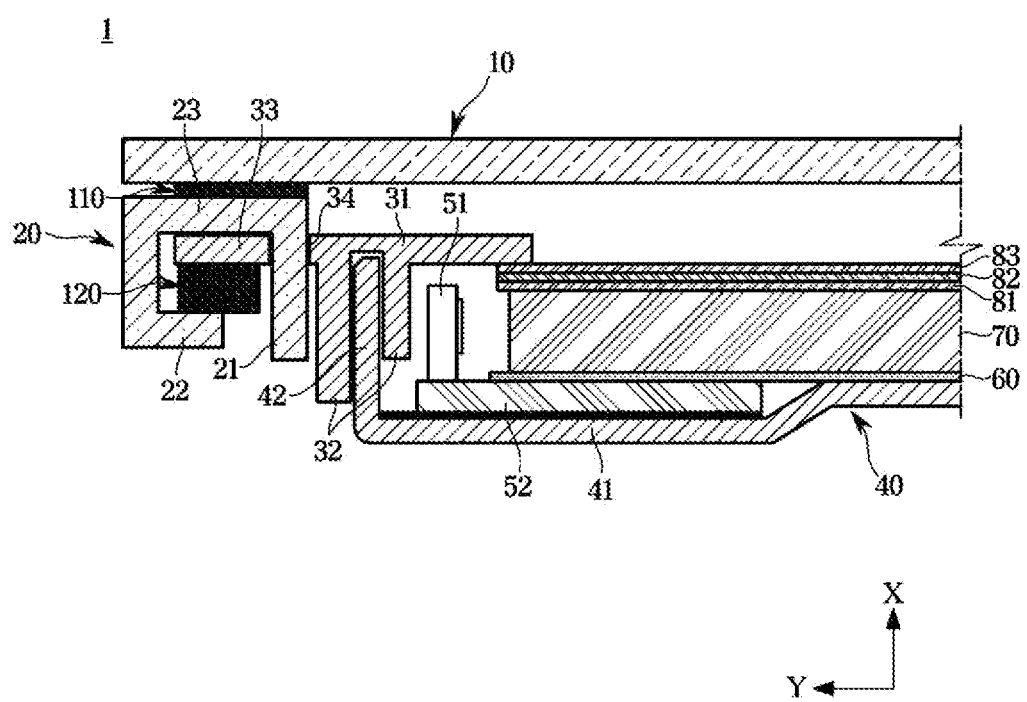
FIG. 4 is the side cross-sectional view of the display apparatus according to an embodiment of the present disclosure, illustrating a state in which a liquid crystal panel is subjected to a force backward.
Figure 5:
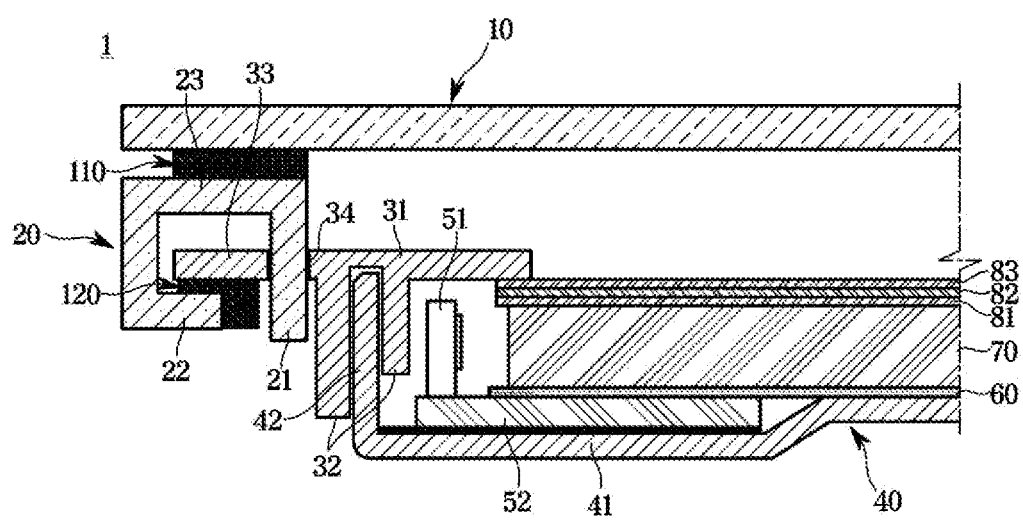
FIG. 5 is the side cross-sectional view of the display apparatus according to an embodiment of the present disclosure, illustrating a state in which the liquid crystal panel is subjected to a force forward.

FIG. 3 is a side cross-sectional view of the display apparatus according to an embodiment of the present disclosure. FIG. 4 is the side cross-sectional view of the display apparatus according to an embodiment of the present disclosure, illustrating a state in which a liquid crystal panel is subjected to a force backward. FIG. 5 is the side cross-sectional view of the display apparatus according to an embodiment of the present disclosure, illustrating a state in which the liquid crystal panel is subjected to a force forward.

Hereinafter, the display apparatus according to an embodiment of the present disclosure will be described in detail with reference to FIGS. 3 to 5.

According to an embodiment of the present disclosure, the liquid crystal panel 10 may be attached to the front chassis 20. An adhesive member 110 may be disposed between the front chassis 20 and the liquid crystal panel 10.

The adhesive member 110 may be provided to attach the liquid crystal panel 10 to the front chassis 20. The adhesive member 110 may include a foam tape. Specifically, the adhesive member 110 may include a double-sided foam tape.

One surface of the adhesive member 110 may be adhered to an edge area of a rear surface of the liquid crystal panel 10. The other surface of the adhesive member 110 may be adhered to a base part 23 of the front chassis 20. The liquid crystal panel 10 may be attached to and fixed to the front chassis 20 by the adhesive member 110.

According to the present disclosure, the front chassis 20 may be provided to be movable forward and backward with respect to the middle mold 30 within the predetermined range.

The liquid crystal panel 10 may be fixed to the front chassis 20, and the liquid crystal panel 10 and the front chassis 20 may be coupled to the middle mold 30. The middle mold 30 may be coupled to the rear chassis 40 and may be fixed so as not to relatively move with respect to the rear chassis 40. As described above, the front chassis 20 is capable of moving forward and backward with respect to the middle mold 30, and due to the forward and backward movement of the front chassis 20, the liquid crystal panel 10 may move forward and backward with respect to the middle mold 30 within a predetermined range.

Referring to FIGS. 3 and 4, when the liquid crystal panel 10 is subjected to a force backward, the liquid crystal panel 10 may move backward within the predetermined range. Specifically, when the liquid crystal panel 10 is subjected to a force backward, the adhesive member 110 is compressed in the front-rear direction (X direction), and the liquid crystal panel 10 and the front chassis 20 may move backward by a compressed length of the adhesive member 110 in the front-rear direction.

According to an embodiment of the present disclosure, the liquid crystal panel 10 may be an IPS mode panel vulnerable to light leakage due to warpage of the liquid crystal panel 10. As one of the ways to reduce light leakage due to warpage of the liquid crystal panel 10, there is a way to reduce the amount of warpage of the liquid crystal panel 10.

According to the present disclosure, light leakage due to warpage of the liquid crystal panel 10 may be reduced by reducing the amount of the warpage of the liquid crystal panel 10. In general, when the liquid crystal panel 10 is subjected to a force backward, while a portion of the liquid crystal panel 10 moves backward, an edge portion of the liquid crystal panel 10 is fixed to the front chassis 20. That is, the portion of the liquid crystal panel 10 that has been subjected to the force backward and the edge portion of the liquid crystal panel 10 supported by the front chassis 20 are spaced apart from each other in the front-rear direction, and as a result, the liquid crystal panel 10 may be warped.

According to the present disclosure, when the liquid crystal panel 10 is subjected to a force backward, the front chassis 20 supporting the edge portion of the liquid crystal panel 10 may move backward together with the edge portion of the liquid crystal panel 10. When the front chassis 20 supporting the edge portion of the liquid crystal panel 10 moves backward, a distance in which the portion of the liquid crystal panel 10 subjected to the force backward and the edge portion of the liquid crystal panel 10 are spaced apart from each other in the front-rear direction is reduced. Due to this, the amount of warpage of the liquid crystal panel 10 may be reduced.

As described above, when the liquid crystal panel 10 is subjected to a force backward, the liquid crystal panel 10 is warped, and light leakage occurs due to the warpage of the liquid crystal panel 10. According to the present disclosure, when the liquid crystal panel 10 is subjected to a force backward, the amount of warpage of the liquid crystal panel 10 may be reduced, and through this, light leakage may be reduced. In other words, according to the present disclosure, as the liquid crystal panel 10 has a degree of freedom in a backward movement, the amount of warpage and light leakage of the liquid crystal panel 10 may be reduced.

According to an embodiment of the present disclosure, the middle mold 30 may include the guide part 34 provided to guide at least a portion of the front chassis 20 to move respectively to the middle mold 30. More specifically, the guide part 34 may guide a slide part 21 of the front chassis 20, which will be described later, to move forward and backward of the middle mold 30. The guide part 34 may be provided in various forms. For example, as illustrated in FIGS. 3 to 5, the guide part 34 may include a hole provided to penetrate the middle mold body 31. Alternatively, the guide part may be provided in the form of a groove.

The front chassis 20 may include the slide part 21 provided to slide forward and backward along the guide part 34. The front chassis 20 may also include a stopper part 22 provided to limit a range of a forward movement of the slide part 21 with respect to the guide part 34. According to an embodiment of the present disclosure, the slide part 21 may be formed to extend backward from one side of the base part 23. The slide part 21 may be inserted into the guide part 34 and move in the front-rear direction in a state of being inserted into the guide part 34. The stopper part 22 may be formed to extend backward from the other side of the base part 23 and then extend laterally. The stopper part 22 may be disposed to face the support part 33 of the middle mold 30.

The stopper part 22 may be provided to limit a range in which the front chassis 20 may move forward with respect to the middle mold 30 in the state in which the slide part 21 is inserted into the guide part 34. The stopper part 22 may be provided to be caught on the support part 33 of the middle mold 30 when the front chassis 20 moves forward with respect to the middle mold 30.

According to an embodiment of the present disclosure, a buffer member 120 may be provided between the support part 33 and the stopper part 22.

The buffer member 120 may be provided to reduce an impact due to contact between the support part 33 and the stopper part 22 when the front chassis 20 moves forward. The buffer member 120 may be provided as a compressible material. For example, the buffer member 120 may include foam tape. The buffer member 120 may be adhered to the support part 33, to the stopper part 22, or to each of the support part 33 and the stopper part 22.

According to the present disclosure, light leakage due to warpage of the liquid crystal panel 10 may be reduced by reducing the amount of warpage of the liquid crystal panel 10. In general, when the liquid crystal panel 10 is subjected to a force forward, while a portion of the liquid crystal panel 10 moves forward, an edge portion of the liquid crystal panel 10 is fixed to the front chassis 20. That is, the portion of the liquid crystal panel 10 that has been subjected to the force forward and the edge portion of the liquid crystal panel 10 supported by the front chassis 20 are spaced apart from each other in the front-rear direction, and as a result, the liquid crystal panel 10 may be warped.

According to the present disclosure, when the liquid crystal panel 10 is subjected to a force forward, the front chassis 20 supporting the edge portion of the liquid crystal panel 10 may move forward together with the edge portion of the liquid crystal panel 10. When the front chassis 20 supporting the edge portion of the liquid crystal panel 10 moves forward, a distance in which the portion of the liquid crystal panel 10 subjected to the force forward and the edge portion of the liquid crystal panel 10 are spaced apart from each other in the front-rear direction is reduced. Due to this, the amount of warpage of the liquid crystal panel 10 may be reduced.

Specifically, when the liquid crystal panel 10 is subjected to a force to move forward, the front chassis 20 may be subjected to the force to move forward together with the liquid crystal panel 10. When the front chassis 20 may be subjected to the force to move forward, the front chassis 20 moves forward, and accordingly, as illustrated in FIG. 5, the buffer member 120 may be compressed. The front chassis 20 may move forward by a length at which the buffer member 120 is compressed in the front-rear direction, and accordingly, as described above, the amount of warpage of the liquid crystal panel 10 may be reduced.

According to an embodiment of the present disclosure, the adhesive member 110 and the buffer member 120 may each be provided as a foam tape.

In this case, as an area of a front surface of the adhesive member 110 is attached to the liquid crystal panel 10 or an area of a rear surface of the adhesive member 110 is attached to the front chassis 20, a length of the adhesive member 110 in the front-rear direction, and a shrinkage rate of the adhesive member 110 are adjusted, an amount of a backward movement of the front chassis 20 is adjustable.

Similarly, as an area of the buffer member 120 coming into contact with the stopper part 22, a length of the buffer member 120 in the front-rear direction, and a shrinkage rate of the buffer member 120 are adjusted, the amount of a forward movement of the front chassis 20 is adjustable.

Figure 6:
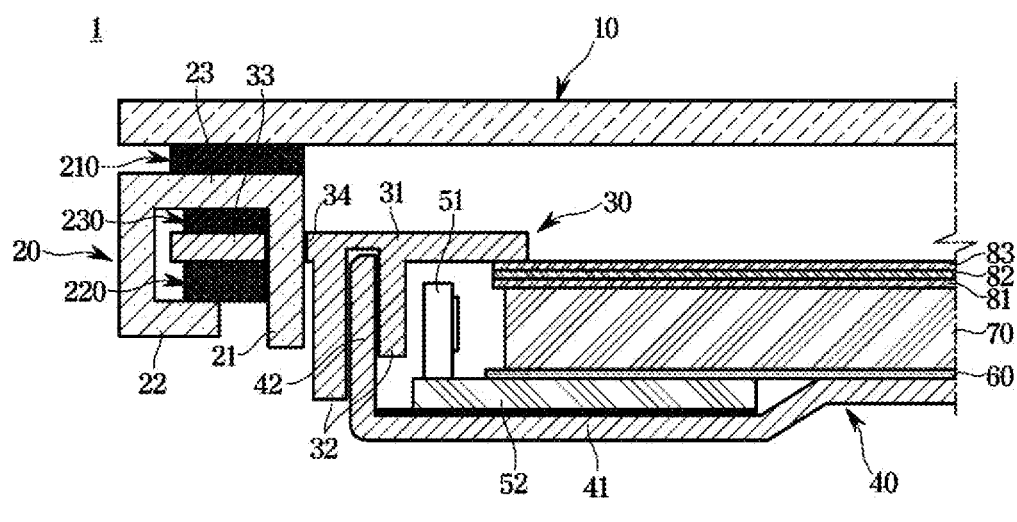
FIG. 6 is a side cross-sectional view of a display apparatus according to another embodiment of the present disclosure.
Figure 7:
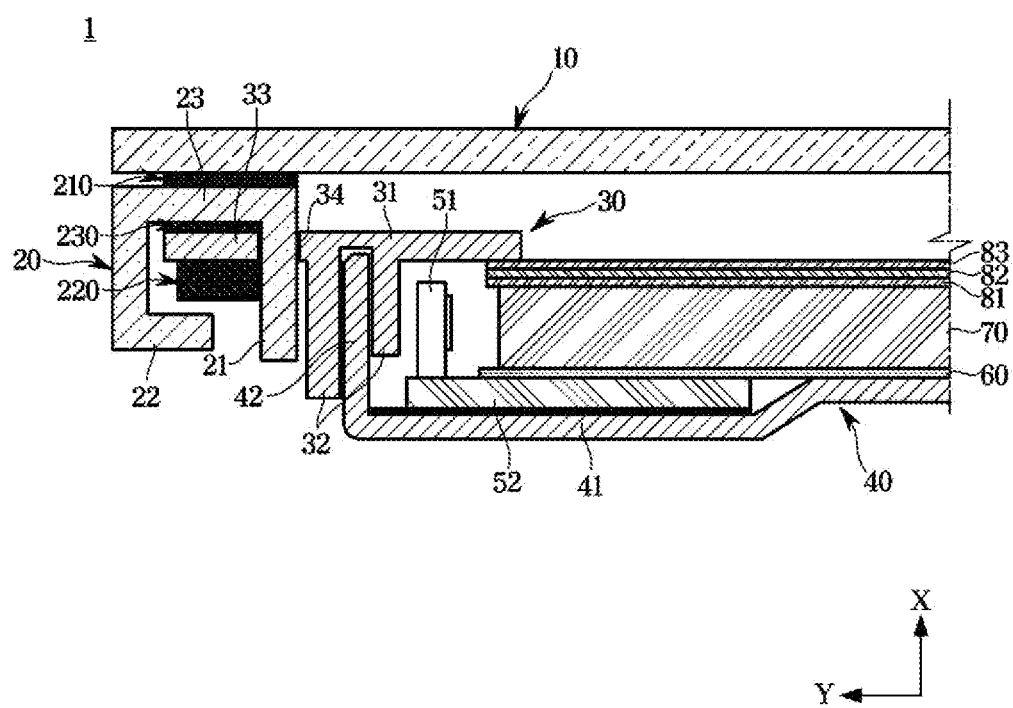
FIG. 7 is the side cross-sectional view of the display apparatus according to another embodiment of the present disclosure, illustrating a state in which a liquid crystal panel is subjected to a force backward.
Figure 8:
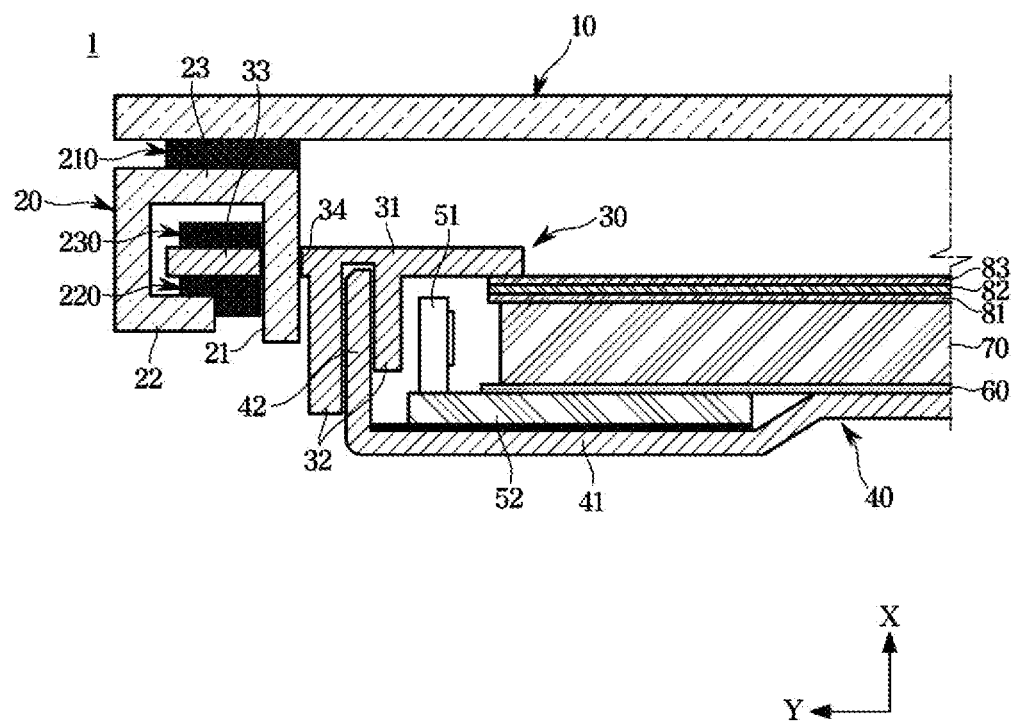
FIG. 8 is the side cross-sectional view of the display apparatus according to another embodiment of the present disclosure, illustrating a state in which the liquid crystal panel is subjected to a force forward.

FIG. 6 is a side cross-sectional view of a display apparatus according to another embodiment of the present disclosure. FIG. 7 is the side cross-sectional view of the display apparatus according to another embodiment of the present disclosure, illustrating a state in which a liquid crystal panel is subjected to a force backward. FIG. 8 is the side cross-sectional view of the display apparatus according to another embodiment of the present disclosure, illustrating a state in which the liquid crystal panel is subjected to a force forward.

Hereinafter, another embodiment of the present disclosure will be described in detail with reference to FIGS. 6 to 8. Descriptions of configurations overlapping with the above will be omitted.

According to another embodiment of the present disclosure, the display apparatus 1 may include an adhesive member 210 provided to attach the liquid crystal panel 10 to the front chassis 20, a first buffer member 220 disposed between the stopper part 22 and the support part 33, and a second buffer member 230 disposed between the support part 33 and the base part 23.

Because the adhesive member 210 is the same as the adhesive member 110 described above, and the first buffer member 220 is the same as the buffer member 120 described above, a detailed description thereof will be omitted.

According to another embodiment of the present disclosure, the second buffer member 230 disposed between the base part 23 of the front chassis 20 and the support part 33 of the middle mold 30 may be provided. The second buffer member 230 may be provided to reduce an impact caused by contact between the base part 23 and the support part 33 when the front chassis 20 moves backward.

Like the first buffer member 220, the second buffer member 230 may be provided as a compressible material. The second buffering member 230 may include a foam tape.

The second buffer member 230 may be provided such that a rear surface thereof is adhered to the support part 33, but is not limited thereto, and may be provided such that a front surface thereof is adhered to the base part 23.

As illustrated in FIG. 6, according to another embodiment of the present disclosure, when an external force is not applied to the display apparatus 1, the adhesive member 210, the first buffer member 220, and the second buffer member 230 may not be compressed.

As illustrated in FIG. 7, when the liquid crystal panel 10 is subjected to a force to move backward, the adhesive member 210 and the second buffer member 230 may be compressed, and the liquid crystal panel 10 and the front chassis 20 may move backward by compressed lengths of the adhesive member 210 and the second buffer member 230 in the front-rear direction.

As illustrated in FIG. 8, when the liquid crystal panel 10 is subjected to a force to move forward, the first buffer member 220 may be compressed, and the liquid crystal panel 10 and the front chassis 20 may move forward by a compressed length of the first buffer member 220 in the front-rear direction.

According to another embodiment of the present disclosure, when the liquid crystal panel 10 and the front chassis 20 move forward by an external force and then the external force is removed, an impact caused by contact between the base part 23 and the support part 33 in a process in which the front chassis 20 moves backward may be reduced.

Although the technical spirit of the present disclosure has been described by specific embodiments, the scope of the present disclosure is not limited to these embodiments. Various embodiments that may be modified or modified by those skilled in the art of the present disclosure would also be within the scope of the present disclosure, without departing from the gist of the present disclosure specified in the claims.

What is claimed is:

1. A display apparatus comprising:
    a rear chassis;
    a light source module installed on the rear chassis and configured to output light;
    a liquid crystal panel disposed in front of the light source module that either blocks the light output from the light source module, or allows the light output from the light source module to pass;
    a middle mold coupled to be fixed to the rear chassis; and
    a front chassis provided to support the liquid crystal panel, the front chassis being coupled to the middle mold, wherein the front chassis is configured to be movable forward and backward with respect to the middle mold within a predetermined range,
    wherein the middle mold uniformly comprises a middle mold body extending in a left-right direction of the display apparatus, a pair of middle mold legs extending in a front-rear direction from the middle mold body, a support part, and a guide part.

2. The display apparatus according to claim 1, further comprising
    an adhesive member having one surface adhered to the liquid crystal panel and the other surface adhered to the front chassis, wherein the adhesive member attaches the liquid crystal panel to the front chassis.

3. The display apparatus according to claim 2, wherein when the liquid crystal panel is subjected to a force backward, the adhesive member is compressed backward and the front chassis moves backward.

4. The display apparatus according to claim 1, wherein the guide part is configured to guide at least a portion of the front chassis to move with respect to the middle mold.

5. The display apparatus according to claim 4, wherein the front chassis comprises a slide part provided to slide forward and backward with respect to the guide part.

6. The display apparatus according to claim 5, wherein the front chassis further comprises a stopper part provided to limit a range of a forward movement of the slide part with respect to the guide part.

7. The display apparatus according to claim 6, wherein the support part is configured to support the middle mold and limit a range of a backward movement of the front chassis with respect to the guide part.

8. The display apparatus according to claim 7, further comprising
    a buffer member disposed between the support part and the stopper part to reduce an impact caused by contact between the support part and the stopper part when the front chassis moves forward.

9. The display apparatus according to claim 8, wherein the front chassis further comprises a base part provided to face the support part and to which an adhesive member is provided to attach the liquid crystal panel to the front chassis, is attached.

10. The display apparatus according to claim 9, wherein the buffer member is a first buffer member, and
    the display apparatus further comprises a second buffer member disposed between the base part and the support part and provided to reduce an impact caused by contact between the base part and the support part when the front chassis moves backward.

11. The display apparatus according to claim 10, wherein the first buffer member and the second buffer member each comprise a foam tape.

12. The display apparatus according to claim 11, wherein the first buffer member is attached to at least one of the support part and the stopper part.

13. The display apparatus according to claim 11, wherein the second buffer member is attached to at least one of the support part and the base part.

14. The display apparatus according to claim 8, wherein an amount of a forward movement of the front chassis is adjustable by adjusting an area of a front surface or a rear surface of the buffer member, a length of the buffer member in a front-rear direction, or a shrinkage rate of the buffer member.

15. The display apparatus according to claim 1, wherein the liquid crystal panel comprises an in-plane switching (IPS) mode liquid crystal panel.

* * * * *